Dec. 1, 1931.    F. C. SIEMENS    1,834,476
REGENERATIVE FURNACE
Filed June 28, 1928    2 Sheets-Sheet 1
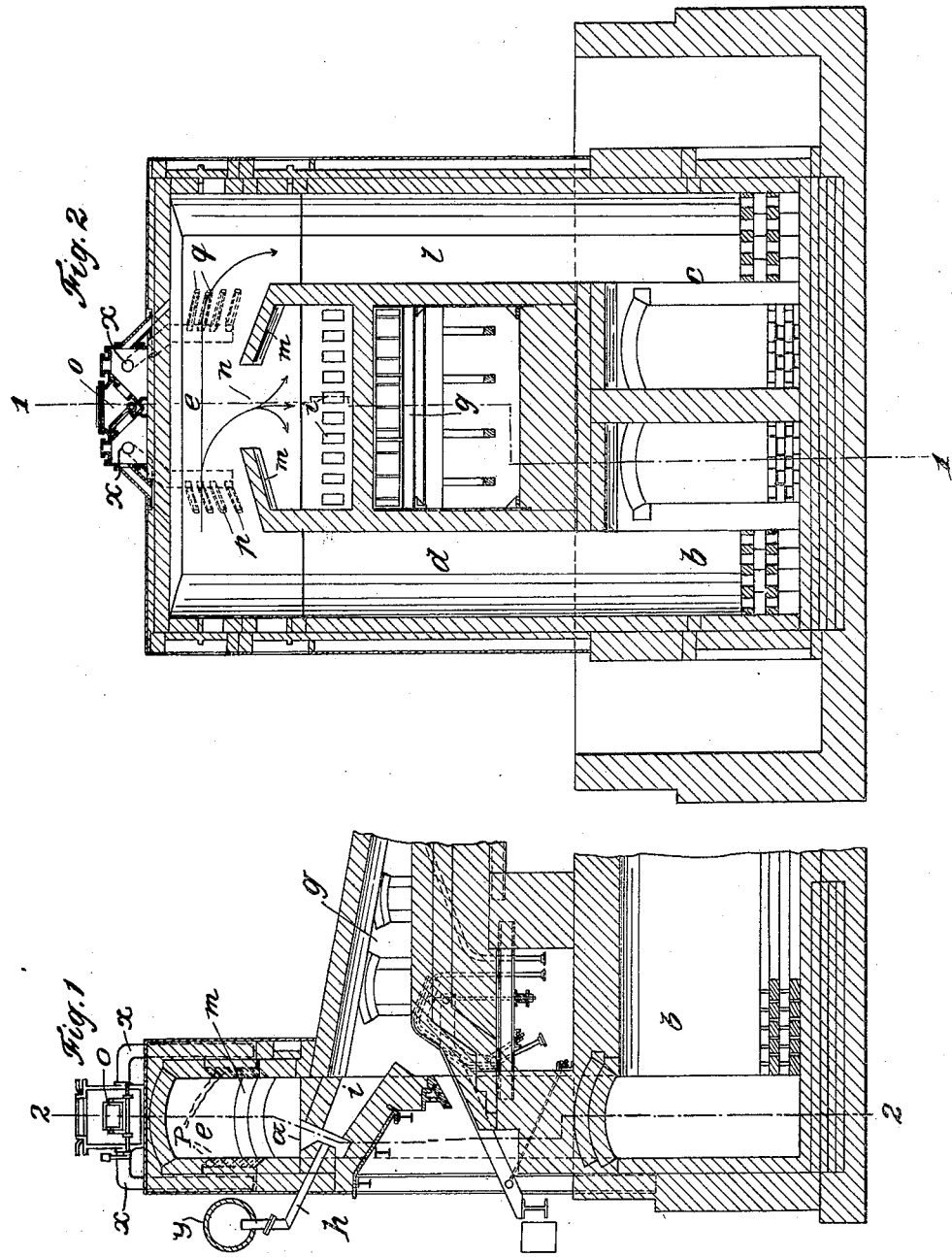
F. C. Siemens
INVENTOR
By: Marks & Clark
ATTYS.

Dec. 1, 1931.  F. C. SIEMENS  1,834,476
REGENERATIVE FURNACE
Filed June 28, 1928   2 Sheets-Sheet 2
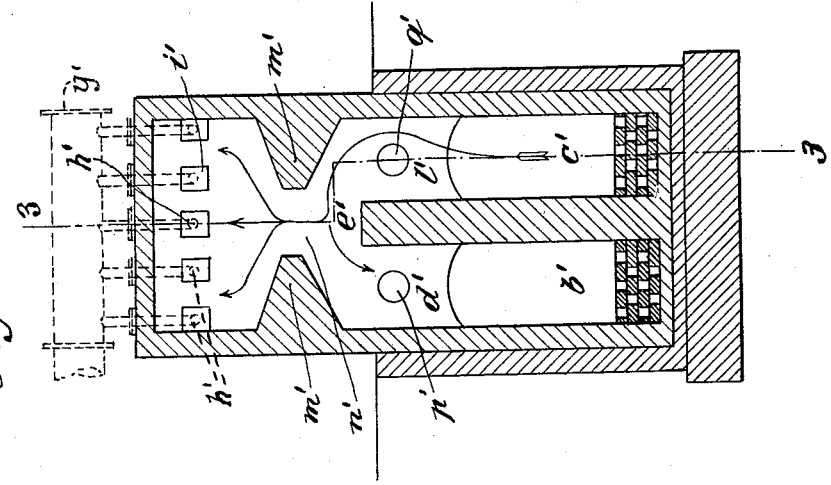
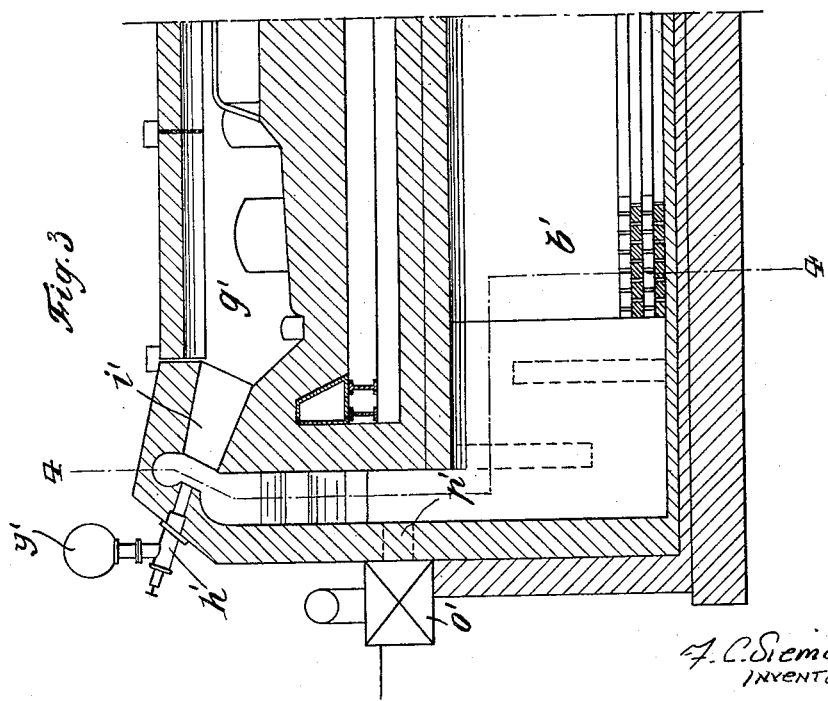
F. C. Siemens
INVENTOR
By: Marks & Clark
ATTYS Patented Dec. 1, 1931

1,834,476

UNITED STATES PATENT OFFICE

FRIEDRICH CARL SIEMENS, OF BERLIN, GERMANY

REGENERATIVE FURNACE

Application filed June 28, 1928, Serial No. 288,994, and in Germany June 29, 1927.

My invention relates to regenerative furnaces having two alternating regenerators, a duct connecting them, means for alternately supplying gas to the regenerators and a continuously operated burner for heating the tunnel of the oven.

It is an object of my invention to effect a more uniform distribution of the air for combustion with respect to the burner, and to this end I provide an air distributing chamber for the burner which is connected with the duct.

In furnaces of the type referred to a horizontal duct is provided from which central passages supply air for combustion to the burner for heating the tunnel of the oven. Experience has shown that the charge of the furnace, as ingots, is not heated uniformly as the quantities of air supplied to the several nozzles of the burner are not equal but the major part of the air is supplied where the air is discharged from the regenerators.

This drawback of the uniflow regenerative furnaces as heretofore designed is overcome according to my invention by supplying the air for combustion to the burner nozzles not directly but through a distributing chamber formed by a partition or arch in the duct connecting the two regenerators having a central opening for admitting air to the burner nozzles. In this manner an antechamber is formed for the air flowing to the burner in which such air is distributed uniformly and equal volumes of air are supplied to the nozzles of the burner the number of which is a function of the width of the furnace.

I may arrange the distributing chamber above, below, or at the side of the passages to the tunnel of the furnace.

In the accompanying drawings, an end-to-end and a transverse uniflow regenerative furnace are illustrated diagrammatically by way of example.

Fig. 1 is a longitudinal section on the line 1—1 of Fig. 2.

Fig. 2 is a section on the line 2—2 in Fig. 1, of the end-to-end furnace.

Fig. 3 is a longitudinal section of a modification of the invention taken on the line 3—3 of Fig. 4.

Fig. 4 is a section on the line 4—4 of Fig. 3.

Referring first to Figs. 1 and 2, $b$ and $c$ are the alternating regenerators for heating the air for combustion, $d$ and $l$ are uptakes extending from the regenerators, $e$ is a duct to which the uptakes are connected at their upper ends, so that the uptakes are connected by the passage $e$, and so are the regenerators $b$ and $c$; $p$ and $q$ are gas nozzles at the ends of the duct $e$; $o$ is a valve for alternately supplying gas to the regenerators; and $x$ are conduits leading from the nozzles to the valve; $m$ is a partition in the duct $e$; $n$ is a central opening in the partition or arch $m$; $a$ is a passage extending downwardly to the burner; $i$ are mixing chambers; $h$ are gas nozzles, connected with a gas supply pipe $y$ and $g$ is the tunnel of the furnace which opens at the end of the furnace as it is of the end-to-end type.

According to Figures 1 and 2 the operation is as follows: the regenerator $b$ receives fresh air, the regenerator $c$ communicates with the chimney. The valve $o$ is adjusted in such a manner that the gas passes out of the nozzle $q$. The fresh air is heated in $b$, rises through $d$ and passes into the duct $e$ where it is divided. The main portion passes through the opening $n$ and the openings $a$ (Fig. 1) downwards to the mixing chambers or burners $i$, is mixed with the gas supplied through the nozzles $h$ and forms the subdivided unidirected flame, which passes through the furnace $g$. The remainder of the air is drawn to $c$, is mixed with the gas passing out of the nozzles $q$ and forms a flame, which extends downwardly through the duct $l$ into the regenerator $c$ and heats the latter. The waste gases are drawn to the chimney. If the regenerator $c$ is sufficiently heated and $b$ correspondingly cooled, the regenerators $b$ and $c$ as well as the valve $o$ will be reversed. The air is now drawn through $c$, is heated and rises in $l$, is divided in $e$ passes to a large extent through $n$ to the furnace burners $i$, $h$ and forms a flame with the gas coming from $p$ ($q$ is now cut off) the said flame passing downwards through d and b being heated etc.

Referring now to Figs. 3 and 4, these illustrate a transverse furnace with a somewhat modified arrangement. Identical parts are marked with the same reference letters primed as in Figs. 1 and 2. Here the uptakes $d'$ and $l'$ from the regenerators $b'$ and $c'$ are connected by a duct $e'$ which is below the partition $m'$, with its central opening $n'$, the gas valve $o'$ is arranged at the front end of the furnace and connected with the uptakes $l'$, $d'$ through short pipes $p'$ and $q'$ which correspond to the nozzles $p$ and $q$ in Figs. 1 and 2. The partition $m'$ separates a chamber from the duct $e'$ which is connected with the mixing chambers $i'$ of the burner nozzles $h'$.

The operation according to Figures 3 and 4 is exactly the same as that of Figures 1 and 2 except that the division of the preliminarily heated air for combustion in $e'$ takes place directly above the regenerators $b'$ and $c'$. $b'$ is heated, $c'$ preliminarily heats the air. After the reversal, the air comes from $b'$, gas is supplied through $q'$ in order to heat $c'$. In any case, the main portion of the preliminarily heated air passes upwards through $n'$ and forms flames with the fresh gas there coming from the nozzles $h'$, the said flames being properly developed in $i'$ and drawn into the furnace.

In the example illustrated in Figs. 1 and 2 the burner is below, and in the example illustrated in Figs. 3 and 4 it is above the distributing chamber. Obviously, the position of the duct $e$ and the chamber with respect to the burners may be varied further, for instance, the duct and the chamber may be arranged at one side of the burner.

I am not limited to the types of furnaces illustrated, as my invention may be applied to any suitable type of furnace.

I claim:

1. A regenerative furnace having a furnace chamber and a pair of alternative regenerating chambers, means providing a passageway from one of said regenerating chambers to a common region, means providing a second passageway from the other of said regenerating chambers to said common region, means providing a passageway from said common region to said furnace chamber, means providing a gas passageway communicating with said first mentioned passageway between said first mentioned regenerating chamber and said common region, means providing a second gas passageway communicating with said second passageway between said other regenerating chamber and said common region, and valve means for controlling said gas passageways.

2. A regenerative furnace having a furnace chamber and a pair of alternative regenerating chambers, means providing a passageway from one of said regenerating chambers to a common region, means providing a second passageway from the other of said regenerating chambers to said common region, means providing a passageway from said common region to said furnace chamber, means providing a gas passageway communicating with said first mentioned passageway between said first mentioned regenerating chamber and said common region, means providing a second gas passageway communicating with said second passageway between said other regenerating chamber and said common region, valve means for controlling said gas passageways, and means providing another gas passageway communicating with said passageway leading from said common region to said furnace.

In testimony whereof I affix my signature.

FRIEDRICH CARL SIEMENS.